United States Patent [19]
Taylor

[11] 3,793,052
[45] Feb. 19, 1974

[54] PENCIL RECEPTIVE CELLOPHANE FILM

[75] Inventor: John S. Taylor, Newark, Del.

[73] Assignee: FMC Corporation, Philadelphia, Pa.

[22] Filed: July 2, 1971

[21] Appl. No.: 159,466

[52] U.S. Cl............. 117/36, 106/168, 117/122 PF, 162/155, 260/37 R
[51] Int. Cl. .............................................. C09j 7/02
[58] Field of Search.. 162/155; 161/161, 162, 5, 36; 106/168, 165; 260/37 R; 117/122

[56] References Cited
UNITED STATES PATENTS

| | | |
|---|---|---|
| 3,627,870 | 12/1971 | Carevic et al....................... 106/168 |
| 3,136,644 | 6/1964 | Pangonis............................. 106/168 |
| 1,934,824 | 11/1933 | Schwalbe et al.................... 117/143 |
| 3,642,562 | 2/1972 | Kawaguchi............................ 161/88 |
| 3,274,013 | 9/1966 | Batt ...................................... 106/168 |
| 3,565,652 | 2/1971 | Burnet................................. 106/168 |

Primary Examiner—William D. Martin
Assistant Examiner—Bernard D. Pianalto

[57] ABSTRACT

A regenerated cellulose film containing both finely-divided β-1,4 glucan particles, preferably microcrystalline cellulose, and finely-divided hard mineral filler particles is disclosed herein. The film is useful as a pencil mark receptive sheet which may be coated on one side with a pressure sensitive adhesive.

3 Claims, No Drawings

PENCIL RECEPTIVE CELLOPHANE FILM

While clear regenerated cellulose pressure sensitive tape is well known, similar tapes which are capable of receiving pencil marks are, for the most part, manufactured from matte-finish cellulose acetate film.

It would be desirable, from the standpoint of lower cost, to provide a regenerated cellulose film which could receive pencil marks satisfactorily.

It is an object of this invention to provide a regenerate cellulose film with good pencil marking receptivity, low gloss and suitability as a base film for pressure sensitive tape.

This and other objects are accomplished in accordance with this invention which comprises a plasticized regenerated cellulose film having dispersed therein (1) from about 5 to about 12 preferably 7 to 9 percent, based on the weight of the film solids, of water-insoluble, non-colloidal, organic particles at least about 90 percent by weight consisting of $\beta$-1,4 glucan, said organic particles having an average size in their greatest dimension ranging from about 10 to about 45 microns, preferably 15 to 25 microns and at least about 85 percent by weight having a size no greater than about 50 microns, and (2) from about 1 to about 4, preferably 2 to 3 percent based on the weight of the film solids, of a finely-divided mineral filler having substantially all particles of a size no greater than 15 microns and an average particle size ranging from about 1 to no greater than about 10 microns.

The water-insoluble, $\beta$-1,4 glucan material is originally derived from cellulose-containing plant life, in most instances, wood, cotton, and bast or leaf fibers. In general, materials obtained from a holo-cellulose source are most useful, for example, ramie, flax, hemp, cotton, processed cellulose containing material, for example, cotton linters, purified cotton, wood pulp such as bleached sulfite and sulfate pulps, regenerated forms of cellulose including rayon and cellophane and the like. If the source material is too low in $\beta$-1,4 glucan content, it is purified to remove nonessential or undesirable compounds which are predominantly polysaccharides such as pentosans, galactomannans, glucomannans and the like, to provide a product containing at least 90 percent and preferably at least 99 percent of $\beta$-1,4 glucan.

The production of the finely-divided $\beta$-1,4 glucan containing material may be carried out by any known means for obtaining fine particle sizes within the prescribed range including, for example, hammer and rolling mills to which the $\beta$-1,4 glucan material is subjected. However, to facilitate production of particles of this size and as a method of obtaining the preferred finely-divided material, the $\beta$-1,4 glucan containing material, hereinafter also referred to by the term "cellulose" for ease of explanation and illustration, is subjected to chemical degradation to an extent sufficient to aid in the mechanical attrition thereof. For example, cellulose is subjected to controlled acid or alkali hydrolysis, or enzymatic treatment and then attrited in a liquid medium. After attrition, the cellulose is dried and classified to obtain particles of the prescribed size.

One specific method of obtaining the desired result is reported in U.S. Pat. No. 2,978,446, issued Apr. 4, 1961, to O. A. Battista et al., wherein cellulose is subjected to a 2.5 normal aqueous solution of hydrochloric acid at boiling (about 105°C.) for 15 minutes. This more drastic hydrolysis treatment provides a material which may be readily mechanically attrited in an aqueous medium with a nominal amount of energy. Similar treatments with mineral acids or alkali under more or less drastic conditions will produce attritable degraded cellulose using nominal or increased energy for disintegration of the material to the proper particle size.

Mechanical attrition may be carried out by known techniques using, for example, kitchen type mixers, blenders, planetary mixers, ball mills, attrition mills, sonic mixers, high speed shearing devices and the like. In addition, the material may be forced through a multiplicity of fine holes whereby it is subjected to a shearing action first by passage through said holes and thereafter by rubbing together of the various particles under the influence of applied force. The disintegration is preferably carried out in the presence of an aqueous medium to appreciably reduce the energy necessary to produce smaller particle sizes. The attrition produces a mass containing some particles having a size of less than 1 micron, however, upon drying, the minute particles agglomerate to form larger sized particles. Drying may be effected by any means such as, for example, air drying, vacuum drying and spray drying. Preferably, the material for use in this invention is spray dried and in the drying the particles become somewhat hornified probably due to the temperatures normally used in the spray drying process.

For the purpose of the invention, water-insoluble derivatives of $\beta$-1,4 glucan having the same physical characteristics and properties may be substituted for $\beta$-1,4 glucan. These derivatives include, for example, oxidation derivatives containing one or more chemical groups including aldehyde, carboxyl and mixed aldehyde-carboxyl derivatives; ether derivatives characterized by having one or more -OR groups where R may be an aliphatic or substituted aliphatic radical, either a straight or branched chain continaing from one to 12 or more carbon atoms, an aryl or aralkyl or substituted aralkyl radical or a carboxyalkyl, hydroxyalkyl, cyanoalkyl, alkoxyalkyl, aralkyoxyalkyl, or a dialkylaminoalkyl radical; and ester derivatives, for example, esters of inorganic acids such as nitrates, sulfates, phosphates, and esters of organic acids such as formates, acetates, propionates, butyrates, thiocyanates, mixed acetate-propionates, mixed acetate-butyrates, other aliphatic carboxylic acid derivatives containing up to 18 or more carbon atoms, and aryl or aralkyl esters such as, for example, benzoates, phenylacetates, phthalates, naphthenates, and the like.

These derivatives may be prepared before the chemical and mechanical attrition treatment by derivatizing the $\beta$-1,4 glucan-containing material to obtain a water-insoluble product, or the finely-divided $\beta$-1,4 glucan material may be derivatized to obtain essentially water-insoluble topochemical derivatives. In any event, the finely-divided $\beta$-1,4 glucan or its derivatives must be water-insoluble and have the physical characteristics and properties as described hereinbefore.

If, in the preparation of the finely-divided organic particles, many larger particles than prescribed are formed, the material is classified to obtain only those within the defined particle size range. Thus, the particles obtained are essentially non-colloidal in size, that is, above 1 micron and usually above 5 microns. The classified particles will have an average particle size ranging from about 10 to about 45 microns, preferably 15 to 25 microns, and at least 85 percent by weight having a size no greater than about 50 microns. Preferably, not more than 3 percent of the finely-divided organic particles will have a size greater than 75 microns.

The inclusion of this material at this particle size into the film is requried to obtain lower gloss, improved pencil marking, reduced pencil line smearing, and reduction of film abrasiveness. Cellulose films containing finely-divided β-1,4 glucan containing material termed "cellulose crystallite aggregates" are broadly claimed in U.S. Pat. No. 3,357,845 to O.A. Battista, issued Dec. 12, 1967.

The mineral filler in the film of this invention is water-insoluble and has a hardness rating of at least 2 Mohs. This is required to improve pencil receptivity of the cellulose film. Aside from improved pencil receptivity, the mineral filler should maintain reduced gloss and low opacity, and demonstrate little difficulty in processing during the production of the pencil receptive cellulose film. The particle size should be substantially uniform and average no greater than about 10 microns. Substantially all of the particles should be less than 15 microns in their greatest dimension in order to avoid abrasion problems when forming and processing the cellulose film. Examples of the mineral fillers sometimes called toothing agents, include diatomaceous earth (flux-calcined), kaolin clay, aluminosilicates, ground glass, wollastonite, and various forms of silica. The preferred mineral fillers include amorphous silica (avg. particle size 5.5 microns,) kaolin (avg. particle size 4.5 microns), pulverized sand (avg. particle size 2.1 microns) and calcined diatomaceous earth (avg. particle size about 3 microns).

An early disclosure of the incorporation of finely-divided mineral fillers in regenerated cellulose films is U. S. Pat. No. 2,054,208, issued Sept. 15, 1936. U. S. Pat. No. 1,934,824, issued Nov. 14, 1933 discloses the incorporation of fillers into coatings which are applied to the surface of regenerated cellulose films.

The finely-divided, non-colloidal, organic particles of β-1,4 glucan and the finely-divided mineral filler are advantageously incorporated into the regenerated cellulose film by pumping a metered amount of an aqueous slurry of a mixture of the two materials into film-forming viscose, that is, a caustic solution of cellulose xanthate. The slurry is pumped into the viscose at a rate sufficient to provide from about 5 to about 12 percent, preferably 7 to 9 percent of the organic particles consisting of β-1,4 glucan in the finished film, based on the weight of the film solids, that is, cellulose film-former, organic particles and mineral filler. The filler is present in the slurry in an amount sufficient to provide from about 1 to about 4, preferably 2 to 3 percent thereof in the film, based on the weight of the film solids.

The viscose is generally spun into a conventional aqueous acidic coagulating and regenerating bath and then through wash baths and a plasticizing bath.

Plasticizers for cellulose film are well known and include, for example, glycerol, ethylene glycol, diethylene glycol, polyethylene glycols, propylene glycol, polypropylene glycols, 1,3 -butylene glycol, 1,3-propanediol, urea, trimethylamine hydrochloride, 1,2,6-hexanetriol, 1,5-pentanediol, block copolymers of polyoxypropylene and polyoxyethylene, hexitols, oxyalkylene derivatives of hexitols, and the like. The amount of plasticizer incorporated in the cellulose film is such as to provide a film of the softness range of a regenerated cellulose film incorporating polyethylene glycol (molecular wt. 400) in an amount ranging from 14 percent to about 18 percent, preferably about 16 percent, based on the weight of the conditioned film. Amounts in excess of this produce films which are too soft for good pencil marking. In the preferred form of this invention, the film is plasticized with polyethylene glycol (molecular weight 200–600) since this material has less tendency to migrate and is readily available.

If desired, one may also incorporate an anchoring agent in the plasticizer bath or in a separate treating bath to improve the adhesion of pressure sensitive coatings to the base cellulosic film used for tapes. Examples of anchoring agents include thermosettable aldehyde resin precondensates including melamine-formaldehyde, urea-formaldehyde, and phenol-formaldehyde; and polyalkyleneimines as are well known in the art.

Regenerated cellulose films which have varying amounts of organic particles consisting of β-1,4 glucan incorporated therein without mineral fillers are not satisfactory from the standpoint of pencil mark receptivity and gloss. Regenerated cellulose films which have varying amounts of hard mineral fillers incorporated therein without β-1,4 glucan particles are unsatisfactory with respect to surface abrasion and pencil line smearing. In addition, manufacture of film incorporating only hard mineral filler caused excessive rubber stator wear in the metering pump. The use of the usually larger particle size β-1,4 glucan particles with the hard mineral filler considerably improved the pump wear problem.

The film of the present invention, at least from an appearance standpoint meets the properties of the film base of presently available matte-finish cellulose acetate tape and is superior to the commerical tape with respect to pencil line smearing.

The film of this invention, if desired, may be coated with a pressure sensitive adhesive composition, for example, as described in U.S. Pat. No. 2,607,711, issued Aug. 19, 1952.

The following examples demonstrate the film of this invention and the method of preparing it.

EXAMPLE I

Non-colloidal, microcrystalline cellulose (or cellulose crystallite aggregates) was prepared in accordance with U.S. Pat. No. 2,978,446, dried and classified to obtain an average particle size of about 20 microns wherein at least 85 percent by weight had a size no greater than 50 microns. A water slurry containing 8 weight percent of this microcrystalline cellulose and 2.4 weight percent of amorphous silica having well classified particles of an average size of 5.5 microns with substantially all less than 15 microns, was pumped at a metered rate into a film-forming viscose solution comprising 9 weight percent cellulose, 5.5 weight percent caustic soda and 28 percent carbon disulfide based on the weight of the cellulose. The viscose was extruded through an elongated slot in an aqueous bath comprising about 13 weight percent sulfuric acid and about 23 percent sodium sulfate. After coagulating and regenerating the film, it was passed through an aqueous plasticizing bath containing 8.1 weight percent polyethylene glycol (mol. wt. 400) and 0.9 weight percent glycerol. The film was then dried in a conventional manner and rolled. The conditioned film was 2 mils thick and contained 16.5 percent plasticizer, based on the weight of the film. The properties of the film for use as a base for pressure sensitive tape which would receive pencil marks were very good. Gloss and haze properties were comparable to commercially available matte-finish cellulose acetate film used as a base for pressure sensitive transparent tapes. The film retained no static charge which is an advantage over cellulose acetate base tapes. The film was adjudged excellent in pencil mark receptivity and also took a "quill-type" pen line well.

As previously stated, the above combination of desirable properties could not be obtained with cellulose films loaded with either the particulate β-1,4 glucan alone or with cellulose films loaded with mineral fillers alone.

Many other regenerated cellulose films were prepared in a manner similar to that described above using various hard mineral fillers. Results were good to excellent for those films coming within the purview of the present invention.

Various changes and modifications may be made in practicing the invention without departing from the spirit and scope thereof and, therefore, the invention is not to be limited except as defined in the appended claims.

I claim:
1. A pencil mark receptive sheet comprising a plasticized regenerated cellulose film having dispersed therein
   1. from about 5 to about 12 percent, based on the weight of the film solids, of water-insoluble, non-colloidal organic particles at least about 90 percent by weight consisting of β-1,4 glucan, said organic particles having an average size in their greatest dimension ranging from about 10 to about 45 microns and at least 85 percent by weight having a size no greater than about 50 microns, and
   2. from about 1 to about 4 percent, based on the weight of the film solids, of a finely-divided water insoluble mineral filler having substantially all particles of a size less than 15 microns and having an average particle size ranging from about 1 to no greater than about 10 microns.

2. The pencil mark receptive sheet of claim 1 wherein the non-colloidal organic particles are microcrystalline cellulose which are present in an amount ranging from about 7 to 9 percent.

3. The pencil mark receptive sheet of claim 1 wherein the mineral filler is selected from the group consisting of amorphous silica, pulverized sand, kaolin clay and calcined diatomaceous earth and which is present in an amount ranging from 2 to 3 percent.

* * * * *

UNITED STATES PATENT OFFICE
CERTIFICATE OF CORRECTION

Patent No. 3,793,052    Dated February 19, 1974

Inventor(s) John S. Taylor

It is certified that error appears in the above-identified patent and that said Letters Patent are hereby corrected as shown below:

Col. 3, line 32, "microns,)" should read --microns),--.
Col. 6, Claim 1, #2, 3rd line, after having, insert --a hardness of at least 2 Mohs and having--.

Signed and sealed this 16th day of July 1974.

(SEAL)
Attest:

McCOY M. GIBSON, JR.
Attesting Officer

C. MARSHALL DANN
Commissioner of Patents